US010657864B2

(12) United States Patent
Li

(10) Patent No.: US 10,657,864 B2
(45) Date of Patent: May 19, 2020

(54) DRIVE CIRCUIT OF DISPLAY DEVICE AND DRIVING METHOD FOR DISPLAY DEVICE HAVING SINGLE-ENDED TO DIFFERENTIAL MODULES

(71) Applicants: HKC Corporation Limited, Shuitian Village, Shiyan Sub-district (CN); Chongqing HKC Optoelectronics Technology Co., Ltd., Chongqing (CN)

(72) Inventor: Wenxin Li, Chongqing (CN)

(73) Assignees: HKC CORPORATION LIMITED, Shenzhen, Guangdong (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/068,404

(22) PCT Filed: Feb. 2, 2018

(86) PCT No.: PCT/CN2018/075048

§ 371 (c)(1),
(2) Date: Jul. 6, 2018

(87) PCT Pub. No.: WO2019/061981

PCT Pub. Date: Apr. 4, 2019

(65) Prior Publication Data

US 2019/0156722 A1 May 23, 2019

(30) Foreign Application Priority Data

Sep. 28, 2017 (CN) .......................... 2017 1 0894018

(51) Int. Cl.
*G06F 3/038* (2013.01)
*G09G 3/20* (2006.01)
(Continued)

(52) U.S. Cl.
CPC ............. *G09G 3/20* (2013.01); *G09G 3/3266* (2013.01); *G09G 3/3674* (2013.01); *G09G 2310/0267* (2013.01); *G09G 2310/0291* (2013.01)

(58) Field of Classification Search
CPC ........................................................ G09G 3/20
(Continued)

(56) References Cited

U.S. PATENT DOCUMENTS

2012/0191921 A1* 7/2012 Shaeffer .............. G06F 13/1678 711/149
2014/0300399 A1* 10/2014 Miyake ................ G09G 3/3677 327/296

FOREIGN PATENT DOCUMENTS

CN 101561597 A 10/2009
CN 101762915 A 6/2010
(Continued)

OTHER PUBLICATIONS

International Search Report and Written Opinion dated Jun. 27, 2018, in International Application No. PCT/CN2018/075048.

*Primary Examiner* — Jonathan M Blancha
(74) *Attorney, Agent, or Firm* — Muncy, Geissler, Olds & Lowe, PC

(57) ABSTRACT

This application provides a drive circuit of a display device and a driving method for the display device. The display device includes a driver module and a display panel. The drive circuit includes: N single-ended to differential modules, connected to N signal output lines of the driver module and 2N scanning lines of the display panel and connected to a clock signal. Each single-ended to differential module is correspondingly connected to one signal output line and two scanning lines. The N single-ended to differential modules are configured to: output, to the 2N scanning lines according to the clock signal, scanning signals output by the N signal
(Continued)

output lines, and charge the 2N scanning lines by using the N signal output lines, where N≥1, and N is a positive integer.

12 Claims, 5 Drawing Sheets

(51) Int. Cl.
*G09G 3/36* (2006.01)
*G09G 3/3266* (2016.01)

(58) Field of Classification Search
USPC .......................................................... 345/208
See application file for complete search history.

(56) References Cited

FOREIGN PATENT DOCUMENTS

| | | | |
|---|---|---|---|
| CN | 102446498 | A | 5/2012 |
| CN | 103578433 | A | 2/2014 |
| CN | 107610634 | A | 1/2018 |
| KR | 20070041829 | A | 4/2007 |

* cited by examiner

DRIVE CIRCUIT OF DISPLAY DEVICE AND DRIVING METHOD FOR DISPLAY DEVICE HAVING SINGLE-ENDED TO DIFFERENTIAL MODULES

BACKGROUND

Technical Field

Embodiments of this application belong to the field of display technologies, and in particular, to a drive circuit of a display device and a driving method for a display device.

Related Art

With the continuous development of display technologies, display devices such as liquid crystal panels and displays continuously develop towards light and thin structure, large screen, low power consumption, and low costs. Common displays include a thin film transistor liquid crystal display (TFT-LCD), a liquid crystal display (LCD), an organic electroluminescence display (OLED), a quantum dot light-emitting diode (QLED) display, and the like.

However, because pixels of a currently commonly-used display are generally charged line by line with one signal output line being corresponding to one scanning line in order to drive the display with a progressive scan, a large number of gate driver ICs are required, and the production costs of the display are greatly increased.

SUMMARY

Embodiments of this application provide a drive circuit of a display device and a driving method for a display device, to resolve the problem that because pixels of a currently commonly-used display are generally charged line by line with one signal output line being corresponding to one scanning line in order to drive the display with a progressive scan, a large number of gate driver ICs are required, and the production costs of the display are greatly increased.

An embodiment of this application provides a drive circuit of a display device, where the display device includes a driver module and a display panel, and the drive circuit includes:

N single-ended to differential modules, connected to N signal output lines of the driver module and 2N scanning lines of the display panel and connected to a clock signal, where each single-ended to differential module is correspondingly connected to one signal output lines and two scanning lines, where the N single-ended to differential modules are configured to: output, to the 2N scanning lines according to the clock signal, scanning signals output by the N signal output lines, and charge the 2N scanning lines by using the N signal output lines, where N≥1 and N is a positive integer.

In an embodiment, the single-ended to differential module includes:

a first electronic switch unit, where an output end of the first electronic switch unit is correspondingly connected to a first scanning line of the display panel; and a second electronic switch unit, where an input end of the second electronic switch unit and an input end of the first electronic switch unit are co-connected to one signal output line, a control end of the second electronic switch unit and a control end of the first electronic switch unit are co-connected and are connected to the clock signal, and an output end of the second electronic switch unit is correspondingly connected to a second scanning line of the display panel.

In an embodiment, the first electronic switch unit includes an N-metal-oxide-semiconductor, and the second electronic switch unit includes a P-metal-oxide-semiconductor. Alternatively, the first electronic switch unit includes a P-metal-oxide-semiconductor, and the second electronic switch unit includes an N-metal-oxide-semiconductor.

In an embodiment, the first electronic switch unit includes an N-metal-oxide-semiconductor, and a drain, a source, and a gate of the N-metal-oxide-semiconductor are respectively the input end, the output end, and the control end of the first electronic switch unit; and the second electronic switch unit includes a P-metal-oxide-semiconductor, and a drain, a source, and a gate of the P-metal-oxide-semiconductor are respectively the input end, the output end, and the control end of the second electronic switch unit.

In an embodiment, the clock signal includes a first level signal and a second level signal alternately sent according to a preset frequency; and when the clock signal is a first level signal, the single-ended to differential module outputs a scanning signal received by the single-ended to differential module to the first scanning line connected to the single-ended to differential module; or when the clock signal is a second level signal, the single-ended to differential module outputs a scanning signal received by the single-ended to differential module to the second scanning line connected to the single-ended to differential module.

An embodiment of this application further provides a driving method for a display device, where the display device includes a driver module and a display panel, the driver module includes N signal output lines, the display panel includes 2N scanning lines, N single-ended to differential modules are connected between the N signal output lines of the driver module and the 2N scanning lines of the display panel, and each single-ended to differential module is correspondingly connected to one signal output line and two scanning lines, where N≥1, and N is a positive integer; and the driving method includes:

controlling the N single-ended to differential modules to receive a clock signal; and controlling the N single-ended to differential modules to: output, to the 2N scanning lines according to the clock signal, scanning signals output by the N signal output lines, and charge the 2N scanning lines by using the N signal output lines.

In an embodiment, the clock signal includes a first level signal and a second level signal alternately sent according to a preset frequency; and the controlling the N single-ended to differential modules to output, to the 2N scanning lines according to the clock signal, scanning signals output by the N signal output lines includes:

when the clock signal is a first level signal, controlling the N single-ended to differential modules to: output, to scanning lines of the display panel in odd-numbered rows, the scanning signals output by the N signal output lines, and charge the scanning lines of the display panel in the odd-numbered rows by using the N signal output lines; or when the clock signal is a second level signal, controlling the N single-ended to differential modules to: output, to scanning lines of the display panel in even-numbered rows, the scanning signals output by the N signal output lines, and charge the scanning lines of the display panel in the even-numbered rows by using the N signal output lines.

An embodiment of this application further provides a display device including a driver module and a display panel, and the drive circuit includes:

N single-ended to differential modules, connected to N signal output lines of the driver module and 2N scanning lines of the display panel and connected to a clock signal, where each single-ended to differential module is correspondingly connected to one signal output lines and two scanning lines, where the N single-ended to differential modules are configured to: when the clock signal is a first level signal, output, to scanning lines of the display panel in odd-numbered rows, scanning signals output by the N signal output lines, and charge the scanning lines of the display panel in the odd-numbered rows by using the N signal output lines; or when the clock signal is a second level signal, output, to scanning lines of the display panel in even-numbered rows, scanning signals output by the N signal output lines, and charge the scanning lines of the display panel in the even-numbered rows by using the N signal output lines, where N≥1, and N is a positive integer.

In the embodiments of this application, the scanning signals output by the N signal output lines of the driver module are output to the 2N scanning lines of the display panel according to the clock signal, and the 2N scanning lines are charged by using the N signal output lines, so that the quantity of driver modules can be reduced, and the production costs of the display device can be effectively reduced.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following descriptions show merely some embodiments of this application, and a person of ordinary skill in the art may still derive other drawings from these accompanying drawings without creative efforts.

DETAILED DESCRIPTION

To make a person skilled in the art better understand the solutions of this application, the following clearly and completely describes the technical solutions in the embodiments of this application with reference to the accompanying drawings of the embodiments of this application. Obviously, the described embodiments are merely a part of the embodiments of the present invention rather than all of the embodiments. All other embodiments obtained by a person of ordinary skill in the art based on the embodiments of this application without creative efforts shall fall within the protection scope of this application.

The term "include" and any variants thereof in this specification, the claims, and the accompanying drawings of this application mean to cover the non-exclusive inclusion. For example, a process, method, system, product, or device that includes a list of steps or units is not limited to the listed steps or units, but may optionally include steps or units not listed, or may optionally include other steps or units inherent to the process, method, system, product, or device. In addition, the terms such as "first", "second", and "third" are used for distinguishing between different objects rather than describing a particular sequence.

Figure 1:
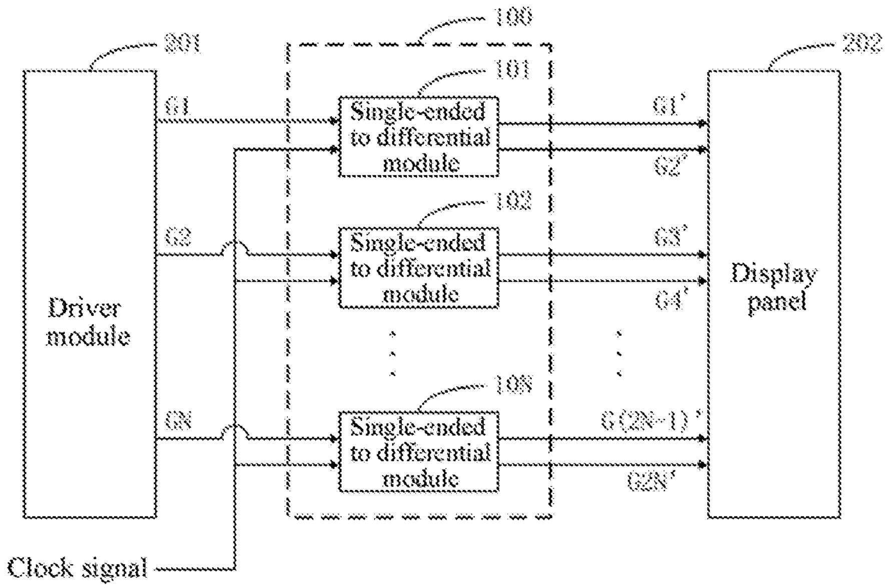
FIG. 1 is a schematic structural diagram of a drive circuit of a display device according to an embodiment of this application.

As shown in FIG. 1, an embodiment of this application provides a drive circuit 100 of a display device, applied to the display device. The display device includes a driver module 201 and a display panel 202. The driver module 201 has N signal output lines (represented by G1, G2, . . . , GN in FIG. 1). The display panel 202 includes 2N scanning lines (only 2N scanning signal input ends of the display panel 202 are exemplarily shown in FIG. 1 and are respectively represented by G1', G2', . . . , G2N', and each scanning signal input end is correspondingly connected to one scanning line and one row of pixels). The drive circuit 100 includes N single-ended to differential modules (respectively represented by 101, 102, . . . , 10N in FIG. 1).

During specific application, the driver module may be any component or circuit having functions of performing progressive scanning and charging on pixels of the display panel, for example, a gate driver IC or a gate-chip on film (G-COF).

During specific application, the display panel may be a display panel of any type, for example, an LCD panel based on a TFT-LCD technology, an LCD panel based on an LCD technology, an OLED panel based on an OLED technology, a QLED display panel based on a QLED technology, or a curved display panel.

The connection relationship between the drive circuit 100, the driver module 201, and the display panel 202 provided in this embodiment is as follows:

The N single-ended to differential modules are respectively connected to the N signal output lines of the driver module 201 and the 2N scanning lines of the display panel 202 and are connected to a clock signal, and each single-ended to differential module is correspondingly connected to one signal output lines and two scanning lines.

As shown in FIG. 1, FIG. 1 exemplarily shows that a single-ended to differential module 101 is connected to a signal output line G1, a scanning signal input end G1', and a scanning signal input end G2', a single-ended to differential module 102 is connected to a signal output line G2, a scanning signal input end G3', and a scanning signal input end G4', . . . , and a single-ended to differential module 10N is connected to a signal output line GN, a scanning signal input end G(2N−1)', and a scanning signal input end G2N'.

During specific application, the quantity of the signal output lines and the quantity of the single-ended to differential modules are determined by the quantity of pixel rows of the display panel, and the quantity of the signal output lines=the quantity of the single-ended to differential modules=the quantity of the pixel rows/2.

The working principle of the drive circuit 100 provided in this embodiment is as follows:

The N single-ended to differential modules are configured to: output, to the 2N scanning lines according to the clock signal, scanning signals output by the N signal output lines, and charge the 2N scanning lines by using the N signal output lines, where N≥1 and N is a positive integer.

During specific application, the clock signal may be provided by a control module dedicated to control working of the drive circuit, or may be provided by a timing controller (TCON) of the display device. The control module may be specifically implemented by using a universal integrated circuit such as a central processing unit (CPU) or an application-specific integrated circuit (ASIC).

In an embodiment, the clock signal includes a first level signal and a second level signal alternately sent according to a preset frequency.

When the clock signal is a first level signal, the single-ended to differential module outputs a scanning signal received by the single-ended to differential module to a first scanning line connected to the single-ended to differential module.

When the clock signal is a second level signal, the single-ended to differential module outputs a scanning signal received by the single-ended to differential module to a second scanning line connected to the single-ended to differential module.

During specific application, a voltage of the first level signal is greater than a voltage of the second level signal, that is, compared with the second level signal, the first level signal is a high level signal, and compared with the first level signal, the second level signal is a low level signal. The first level signal may be represented by a binary logical digit 1, and the second level signal may be represented by a binary logical digit 0.

During specific application, the drive circuit may be specifically disposed in a fan-out region of the display panel.

In an embodiment, the N single-ended to differential modules are specifically configured to:

when the clock signal is a first level signal, output, to scanning lines of the display panel in odd-numbered rows, the scanning signals output by the N signal output lines, and charge the scanning lines of the display panel in the odd-numbered rows by using the N signal output lines; or when the clock signal is a second level signal, output, to scanning lines of the display panel in even-numbered rows, the scanning signals output by the N signal output lines, and charge the scanning lines of the display panel in the even-numbered rows by using the N signal output lines.

In this embodiment, the scanning signals output by the N signal output lines of the driver module are output to the 2N scanning lines of the display panel according to the clock signal, and the 2N scanning lines are charged by using the N signal output lines, so that the quantity of driver modules can be reduced, and the production costs of the display device can be effectively reduced.

Figure 2:
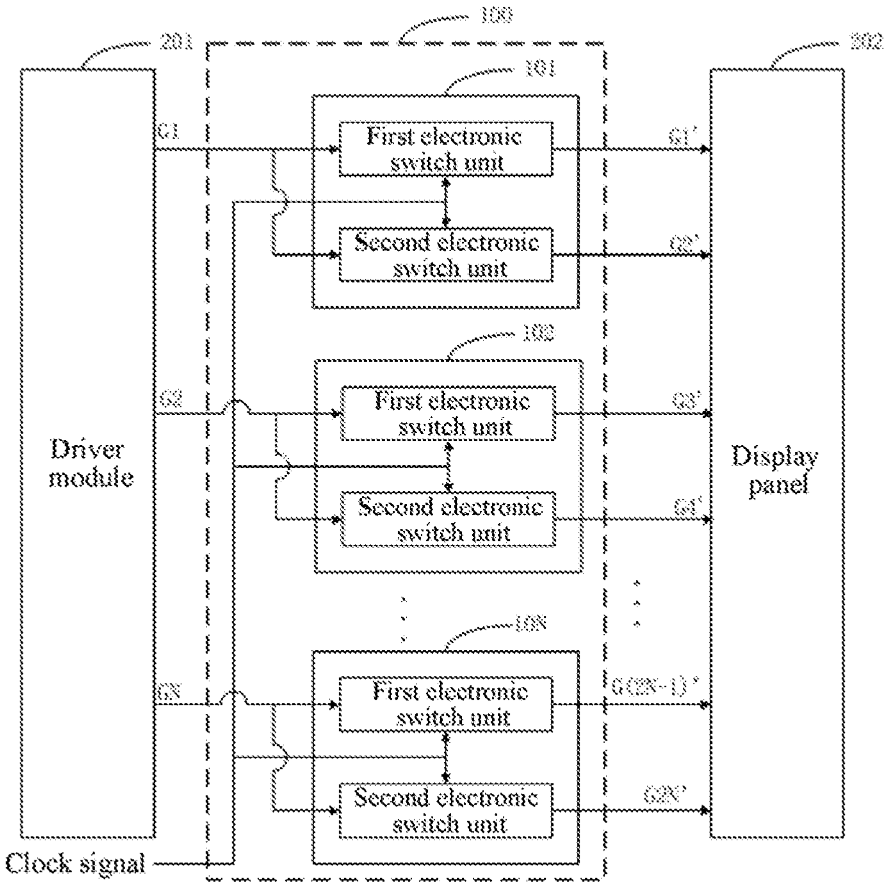
FIG. 2 is a schematic structural diagram of a drive circuit of a display device according to another embodiment of this application.

As shown in FIG. 2, in an embodiment of this application, each single-ended to differential module includes a first electronic switch unit and a second electronic switch unit.

During specific application, the first electronic switch unit may include an N-metal-oxide-semiconductor, and the second electronic switch unit may include a P-metal-oxide-semiconductor. Alternatively, the first electronic switch unit includes a P-metal-oxide-semiconductor, and the second electronic switch unit includes an N-metal-oxide-semiconductor.

Connection relationships between the first electronic switch unit and the second electronic switch unit provided in this embodiment and other components of the display device are as follows:

An output end of the first electronic switch unit is correspondingly connected to the first scanning line of the display panel 202, that is, the output end of the first electronic switch unit forms a connecting end between the single-ended to differential module and the display panel.

An input end of the second electronic switch unit and an input end of the first electronic switch unit are co-connected to one signal output line, that is, the input end of the second electronic switch unit and the input end of the first electronic switch unit are co-connected to form a connecting end of connection between the single-ended to differential module and the driver module.

A control end of second electronic switch unit and a control end of the first electronic switch unit are co-connected and are connected to the clock signal, an output end of the second electronic switch unit is correspondingly connected to the second scanning line of the display panel 202, that is, the control end of the second electronic switch unit and the control end of the first electronic switch unit are co-connected to form a port of the single-ended to differential module for connecting to the clock signal, and the output end of the second electronic switch unit forms another connecting end of connection between the single-ended to differential module and the display panel.

Figure 3:
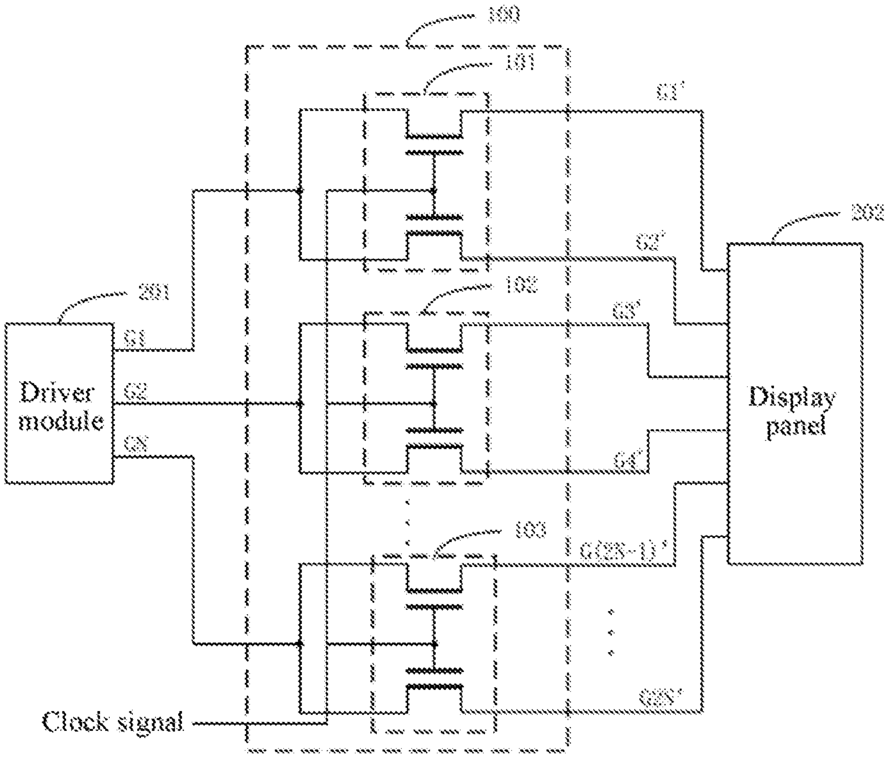
FIG. 3 is a schematic structural diagram of a drive circuit of a display device according to still another embodiment of this application.

As shown in FIG. 3, in an embodiment of this application, the first electronic switch unit includes an N-metal-oxide-semiconductor, and a drain, a source, and a gate of the N-metal-oxide-semiconductor are respectively the input end, the output end, and the control end of the first electronic switch unit. The second electronic switch unit includes a P-metal-oxide-semiconductor, and a drain, a source, and a gate of the P-metal-oxide-semiconductor are respectively the input end, the output end, and the control end of the second electronic switch unit.

Based on the structure of the drive circuit shown in FIG. 3, the working principle of the display device provided in this embodiment of this application is as follows:

When a channel G1 of the driver module 201 starts to output a scanning signal, and when the clock signal is a low level signal, in this case, the NMOS of the single-ended to differential module 101 is switched on, the PMOS is switched off, and the scanning signal output by the channel G1 is output to the first scanning line of the display panel 202 by using an end G1'; or when the clock signal is a high level signal, in this case, the PMOS of the single-ended to differential module 101 is switched on, the NMOS is switched off, and the scanning signal output by the channel G1 is output to the second scanning line of the display panel 202 by using an end G2'.

When a channel G2 of the driver module 201 starts to output a scanning signal, and when the clock signal is a low level signal, in this case, the NMOS of the single-ended to differential module 102 is switched on, the PMOS is switched off, and the scanning signal output by the channel G2 is output to a third scanning line of the display panel 202 by using an end G3'; or when the clock signal is a high level signal, in this case, the PMOS of the single-ended to differential module 102 is switched on, the NMOS is switched off, and the scanning signal output by the channel G2 is output to a fourth scanning line of the display panel 202 by using an end G4'.

The working principles of other single-ended to differential modules are obtained by analogy according to the foregoing principle.

Figure 4:
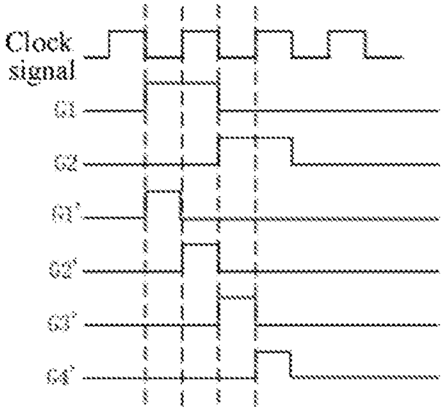
FIG. 4 is a waveform graph of a clock signal and a scanning signal according to an embodiment of this application.

As shown in FIG. 4, FIG. 4 exemplarily shows a clock signal and a scanning signal applied to the drive circuit shown in FIG. 3. The clock signal and the scanning signal in FIG. 4 are both square wave signals, and FIG. 4 only exemplarily shows signal waveforms on two signal output lines and four scanning lines.

The structure of a fan-out circuit provided in this embodiment can enable any driver module to charge scanning lines whose quantity is twice the quantity of signal output lines of the driver module, so that a half of the quantity of driver modules can be saved, thereby saving the costs.

Figure 5:
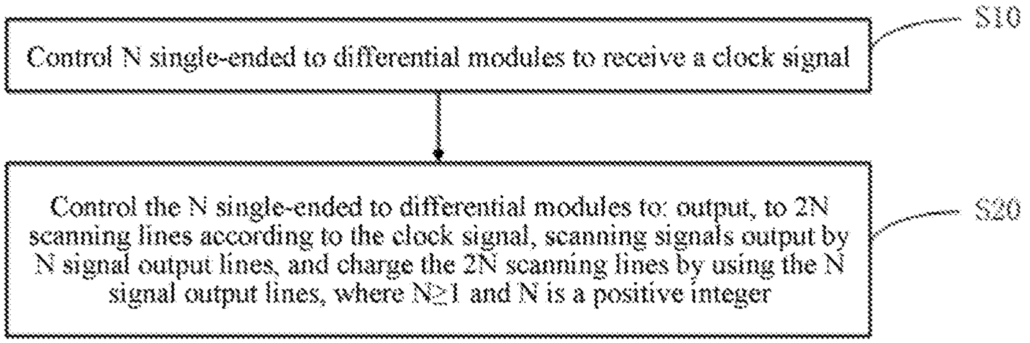
FIG. 5 is a flowchart of a driving method for a display device according to an embodiment of this application.

As shown in FIG. 5, an embodiment of this application provides a driving method for a display device, including the following steps.

Step S10: Control N single-ended to differential modules to receive a clock signal.

Step S20: Control the N single-ended to differential modules to: output, to 2N scanning lines according to the clock signal, scanning signals output by N signal output lines, and charge the 2N scanning lines by using the N signal output lines, where N≥1 and N is a positive integer.

During specific application, the single-ended to differential module may be any circuit or component for converting a signal input from a port into two signals and outputting the two signals, for example, the single-ended to differential module in the drive circuit provided in any one of the foregoing embodiments.

During specific application, the method may be implemented based on the drive circuit provided in any one of the foregoing embodiments.

Figure 6:
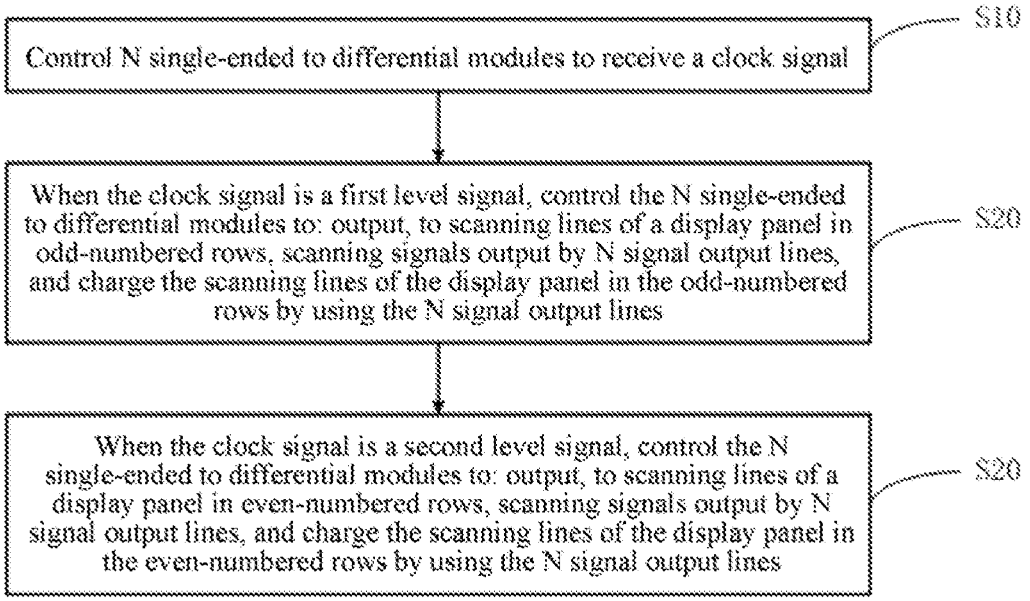
FIG. 6 is a flowchart of a driving method for a display device according to another embodiment of this application.

As shown in FIG. 6, in an embodiment, when the clock signal includes a first level signal and a second level signal alternately sent according to a preset frequency, step S20 specifically includes the following steps:

Step S21: When the clock signal is a first level signal, control the N single-ended to differential modules to: output, to scanning lines of a display panel in odd-numbered rows, the scanning signals output by the N signal output lines, and charge the scanning lines of the display panel in the odd-numbered rows by using the N signal output lines.

Step S22: When the clock signal is a second level signal, control the N single-ended to differential modules to: output, to scanning lines of a display panel in even-numbered rows, the scanning signals output by the N signal output lines, and charge the scanning lines of the display panel in the even-numbered rows by using the N signal output lines.

In this embodiment of this application, the scanning signals output by the N signal output lines of the driver module are output to the 2N scanning lines of the display panel according to the clock signal, and the 2N scanning lines are charged by using the N signal output lines, so that the quantity of driver modules can be reduced, and the production costs of the display device can be effectively reduced.

Figure 7:
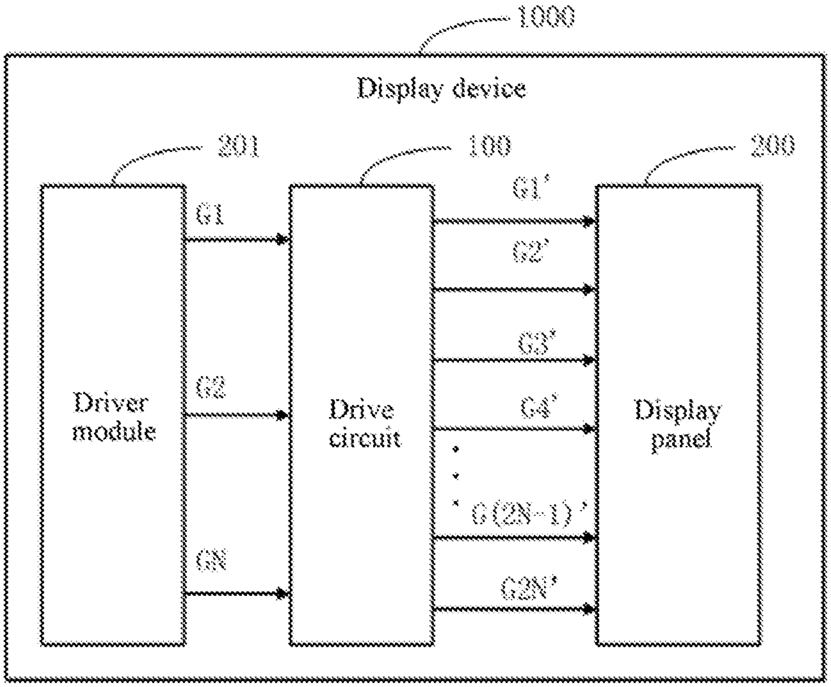
FIG. 7 is a schematic structural diagram of a display device according to an embodiment of this application.

As shown in FIG. 7, an embodiment of this application provides a display device 100, including a driver module 201, a display panel 202, and the drive circuit 100 in the foregoing embodiment. The driver module 201 includes N signal output lines, and the display panel 202 includes 2N scanning lines, where N≥1 and N is a positive integer.

During specific application, the driver module may be any component or circuit having functions of performing progressive scanning and charging on pixels of the display panel, for example, a gate driver IC or a G-COF.

During specific application, the display panel may be a display panel of any type, for example, an LCD panel based on a TFT-LCD technology, an LCD panel based on an LCD technology, an OLED panel based on an OLED technology, a QLED display panel based on a QLED technology, or a curved display panel.

In an embodiment, the display device 1000 further includes a screen driver module, connected to the drive circuit and configured to output a clock signal.

During specific application, the screen driver module may be a TCON or may be implemented by using a universal integrated circuit such as a CPU or by using an ASIC.

In this embodiment, a display device including the foregoing drive circuit is provided, so as to decrease the quantity of driver modules to a half of the original quantity, thereby effectively reducing the costs of the display device.

The steps in the method in the embodiment of this application can be sequentially adjusted, combined, or deleted according to an actual requirement.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (ROM), or a random access memory (RAM).

The foregoing descriptions are merely preferred embodiments of this application, and are not intended to limit this application. Any modification, equivalent change, or improvement made in accordance with the spirits and principles of this application shall fall within the protection scope of this application.

What is claimed is:

1. A drive circuit of a display device, wherein the display device comprises a driver module and a display panel, and the drive circuit of the display device comprises:

N single-ended to differential modules, connected to N signal output lines of the driver module and 2N scanning lines of the display panel and connected to a clock signal, wherein each single-ended to differential module is correspondingly connected to one signal output lines and two scanning lines, wherein the N single-ended to differential modules are configured to: output, to the 2N scanning lines according to the clock signal, scanning signals output by the N signal output lines, and charge the 2N scanning lines by using the N signal output lines, wherein N≥1 and N is a positive integer;

the single-ended to differential module comprises:

a first electronic switch unit, wherein an output end of the first electronic switch unit is correspondingly connected to a first scanning line of the display panel; and a second electronic switch unit, wherein an input end of the second electronic switch unit and an input end of the first electronic switch unit are co-connected to one signal output line, a control end of the second electronic switch unit and a control end of the first electronic switch unit are co-connected and are connected to the clock signal, and an output end of the second electronic switch unit is correspondingly connected to a second scanning line of the display panel;

the clock signal comprises a first level signal and a second level signal alternately sent according to a preset frequency;

when the clock signal is a first level signal, the single-ended to differential module outputs a scanning signal received by the single-ended to differential module to the first scanning line connected to the single-ended to differential module; and when the clock signal is a second level signal, the single-ended to differential module outputs a scanning signal received by the single-ended to differential module to the second scanning line connected to the single-ended to differential module.

2. The drive circuit of the display device according to claim 1, wherein the first electronic switch unit comprises an N-metal-oxide-semiconductor, and the second electronic switch unit comprises a P-metal-oxide-semiconductor; or the first electronic switch unit comprises a P-metal-oxide-semiconductor, and the second electronic switch unit comprises an N-metal-oxide-semiconductor.

3. The drive circuit of the display device according to claim 2, wherein a drain of the N-metal-oxide-semiconductor is the input end of the first electronic switch unit.

4. The drive circuit of the display device according to claim 2, wherein a source of the N-metal-oxide-semiconductor is the output end of the first electronic switch unit.

5. The drive circuit of the display device according to claim 2, wherein a gate of the N-metal-oxide-semiconductor is the control end of the first electronic switch unit.

6. The drive circuit of the display device according to claim 2, wherein a drain of the P-metal-oxide-semiconductor is the input end of the first electronic switch unit.

7. The drive circuit of the display device according to claim 2, wherein a source and a gate of the P-metal-oxide-semiconductor are respectively the output end and the control end of the first electronic switch unit.

8. A driving method for a display device, wherein the display device comprises a driver module and a display panel, the driver module comprises N signal output lines, the display panel comprises 2N scanning lines, N single-ended to differential modules are connected between the N signal output lines of the driver module and the 2N scanning lines of the display panel, and each single-ended to differential module is correspondingly connected to one signal output line and two scanning lines, wherein N≥1, and N is a positive integer; and the driving method comprises:

controlling the N single-ended to differential modules to receive a clock signal; and controlling the N single-ended to differential modules to: output, to the 2N scanning lines according to the clock signal, scanning signals output by the N signal output lines, and charge the 2N scanning lines by using the N signal output lines;

wherein:

the single-ended to differential module comprises: the controlling the N single-ended to differential modules to output, to the 2N scanning lines according to the clock signal, scanning signals output by the N signal output lines comprises:

when the clock signal is a first level signal, controlling the N single-ended to differential modules to: output, to scanning lines of the display panel in odd-numbered rows, the scanning signals output by the N signal output lines, and charge the scanning lines of the display panel in the odd-numbered rows by using the N signal output lines; and when the clock signal is a second level signal, controlling the N single-ended to differential modules to: output, to scanning lines of the display panel in even-numbered rows, the scanning signals output by the N signal output lines, and charge the scanning lines of the display panel in the even-numbered rows by using the N signal output lines; and the single-ended to differential module comprises:

a first electronic switch unit, wherein an output end of the first electronic switch unit is correspondingly connected to a first scanning line of the display panel; and a second electronic switch unit, wherein an input end of the second electronic switch unit and an input end of the first electronic switch unit are co-connected to one signal output line.

9. The driving method for a display device according to claim 8, wherein a control end of the second electronic switch unit and a control end of the first electronic switch unit are co-connected and are connected to the clock signal.

10. The driving method for a display device according to claim 8, wherein an output end of the second electronic switch unit is correspondingly connected to a second scanning line of the display panel.

11. The driving method for a display device according to claim 8, wherein the first electronic switch unit comprises an N-metal-oxide-semiconductor, and the second electronic switch unit comprises a P-metal-oxide-semiconductor; or the first electronic switch unit comprises a P-metal-oxide-semiconductor, and the second electronic switch unit comprises an N-metal-oxide-semiconductor.

12. A drive circuit of a display device, wherein the display device of the display device comprises a driver module and a display panel, and the drive circuit comprises:

N single-ended to differential modules, connected to N signal output lines of the driver module and 2N scanning lines of the display panel and connected to a clock signal, wherein each single-ended to differential module is correspondingly connected to one signal output lines and two scanning lines, wherein the N single-ended to differential modules are configured to: when the clock signal is a first level signal, output, to scanning lines of the display panel in odd-numbered rows, scanning signals output by the N signal output lines, and charge the scanning lines of the display panel in the odd-numbered rows by using the N signal output lines; or when the clock signal is a second level signal, output, to scanning lines of the display panel in even-numbered rows, scanning signals output by the N signal output lines, and charge the scanning lines of the display panel in the even-numbered rows by using the N signal output lines, wherein N≥1, and N is a positive integer;

the single-ended to differential module comprises:

a first electronic switch unit, wherein an output end of the first electronic switch unit is correspondingly connected to a first scanning line of the display panel; and a second electronic switch unit, wherein an input end of the second electronic switch unit and an input end of the first electronic switch unit are co-connected to one signal output line, a control end of the second electronic switch unit and a control end of the first electronic switch unit are co-connected and are connected to the clock signal, and an output end of the second electronic switch unit is correspondingly connected to a second scanning line of the display panel;

the clock signal comprises a first level signal and a second level signal alternately sent according to a preset frequency;

when the clock signal is a first level signal, the single-ended to differential module outputs a scanning signal received by the single-ended to differential module to the first scanning line connected to the single-ended to differential module; and when the clock signal is a second level signal, the single-ended to differential module outputs a scanning signal received by the single-ended to differential module to the second scanning line connected to the single-ended to differential module.

* * * * *